L. PAGE & L. WEBER. 2 Sheets—Sheet 1.
Said PAGE assignor to said WEBER.
CURTAIN FIXTURE.
No. 10,662. Reissued Nov. 17, 1885.
Fig. 1.
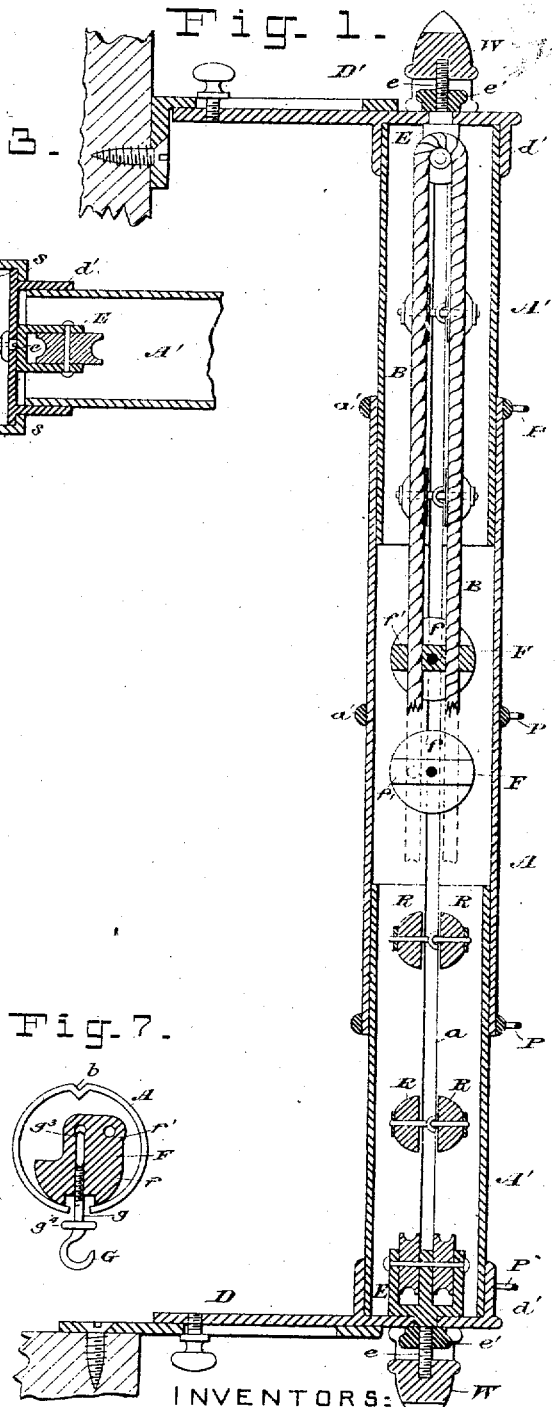
Fig. 2.
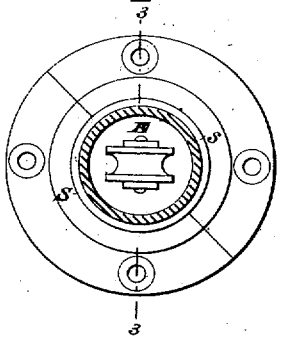
Fig. 3.
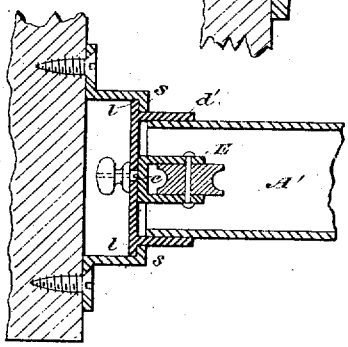
Fig. 4.
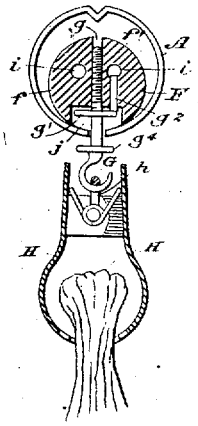
Fig. 5.
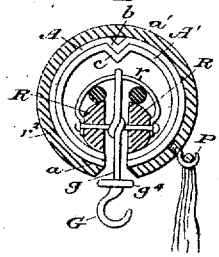
Fig. 6.
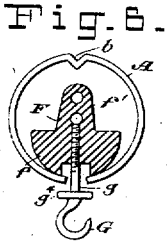
Fig. 7.
WITNESSES:
E. R. Bolton
Geo. Bainton
INVENTORS:
Louis Page and Louis Weber
By their Attorneys,
Burke, Fraser & Connett L. PAGE & L. WEBER. 2 Sheets—Sheet 2.

Said PAGE assignor to said WEBER.

CURTAIN FIXTURE.

No. 10,662. Reissued Nov. 17, 1885.

WITNESSES:

E. B. Bolton

Geo. Bainton

INVENTORS:

Louis Page and

Louis Weber

By their Attorneys,

Burke, Fraser & Connett

UNITED STATES PATENT OFFICE.

LOUIS PAGE AND LOUIS WEBER, OF BROOKLYN, NEW YORK; SAID PAGE ASSIGNOR TO SAID WEBER.

CURTAIN-FIXTURE.

SPECIFICATION forming part of Reissued Letters Patent No. 10,662, dated November 17, 1885.

Original No. 297,627, dated April 29, 1884. Application for reissue filed December 2, 1884. Serial No. 149,358.

*To all whom it may concern:*

Be it known that we, LOUIS PAGE and LOUIS WEBER, both citizens of the United States, and residents of Brooklyn, Kings county, New York, have jointly invented certain Improvements in Curtain-Fixtures, of which the following is a specification.

Our invention relates particularly to curtain-fixtures applicable to curtains suspended from supporting-bars and arranged to slide along the latter, and is an improvement on the invention shown and described in our Letters Patent No. 291,928, dated January 15, 1884. This patent describes the curtain as suspended from balls or knobs, which slide inside of the extensible tubular bar when the curtain is drawn back and forth along the bar.

The objects of our improvements are, in part, to provide a bracket for the curtain-bar with two sockets, one for the bar and one for the end knob of the bar; in part to provide the bar with a divided socket to support its end; in part to provide a three-part extensible bracket for the bar; in part to provide an improved means for securing the "master-ball" to the operating-cord; in part to the curtain-bar provided with rings and hooks projecting therefrom to support a supplementary lambrequin; in part to an improved construction of the curtain-supporting balls or devices, and in part to the means for mounting the cord-guiding pulleys in the brackets, all of which will be fully hereinafter described, and specifically defined in the claims.

Figure 8:
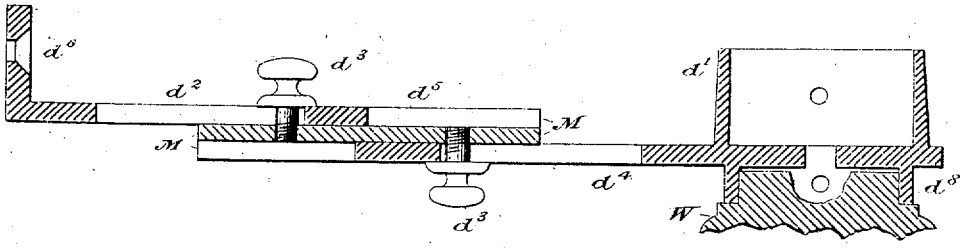
Figure 10:
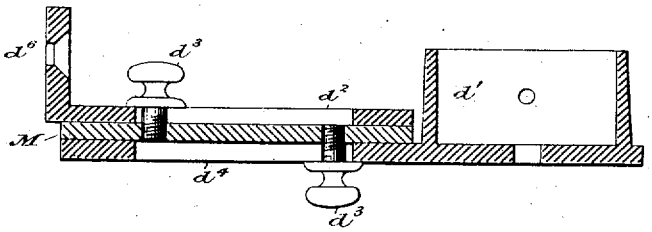
Figure 11:
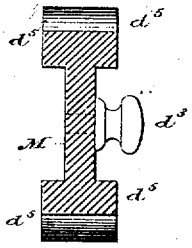
Figure 9:
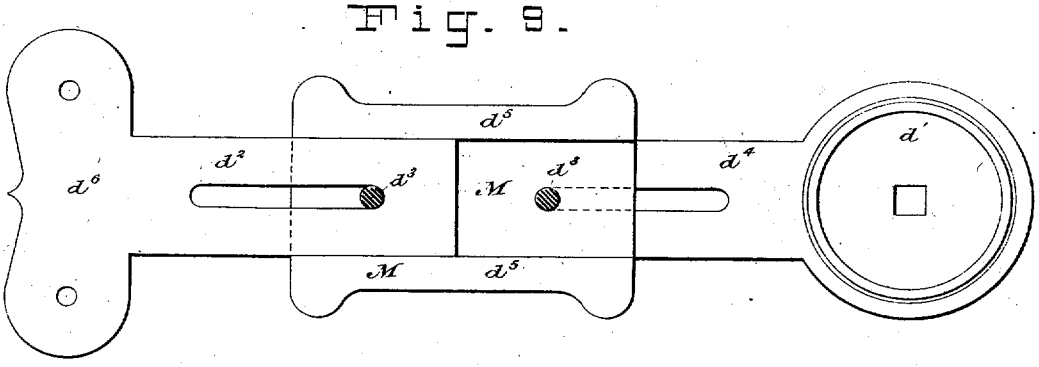

In the drawings which illustrate our invention, Figure 1 is a horizontal longitudinal section of our improved curtain-bar, the extensible supporting-brackets and some of the internal curtain-operating mechanism being also in section. Fig. 2 is a front view, and Fig. 3 a section, of our improved curtain-bar-supporting socket. The plane of the section in Fig. 3 is taken on line 3 3 in Fig. 2. Fig. 4 is a cross-section of the curtain-bar and of a master-ball, to which the free or moving edge of the curtain is attached. Fig. 5 is a cross-section of the bar, taken through one of the curtain-supporting devices arranged to roll inside the bar. Figs. 6 and 7 are cross-sections of the bar similar to Fig. 4, and illustrating modifications of the master-ball. Fig. 8 is a longitudinal section of our three-part bracket as extended. Fig. 9 is a side elevation of same. Fig. 10 is a section similar to Fig. 8, but showing the bracket contracted. Fig 11 is a cross-section of the flanged middle section, M, of the bracket.

Referring to Fig. 1, the curtain-bar is tubular, and comprises a middle section, A, and end sections, A′ A′, which latter telescope into the middle section, A. All of these sections are slit open or slotted longitudinally on their under sides, as shown at *a*, so as to permit the shanks of the hooks G to pass into and slide along the bar, and to fasten to the curtain-supporting balls or rollers, to which they are fixedly attached, except as to the master-balls F F, to which they are connected as will be hereinafter described.

To prevent the sections of the bar from turning upon each other when made cylindrical—which would put the slots in their lower sides out of line, and thus obstruct the free movement of the curtain-supporting hooks along said slots—we form a longitudinal rib, *b*, along the inside of the middle section, A, and a corresponding groove, *c*, along the exterior of the end sections, A′ A′, which telescope into A, and cause the rib *b* to engage the grooves *c*, as clearly shown in Fig. 5. This specific device we do not claim, as it has been before used for similar purposes.

The brackets D D′ have sockets *d*′ formed on their ends to receive the ends of the bar, and the shank *e* of the sheave-frame E passes through the cap-plate of said socket, and is secured by a nut, *e*′. To prevent the shank *e* from turning, it is made square where it passes through the cap-plate, which has a square hole in it to receive said shank. On the end of shank *e* is screwed an ornamental knob, W.

In Figs. 8, 9, 10, and 11 we have illustrated our improved three-parts extensible bracket. M is the middle section of the bracket, which has grooves in its opposite sides to receive the slotted portions $d^2$ and $d^4$ of the bracket, and screws $d^3$ pass through the slots in these portions and screw into the middle section, M. The portions $d^2$ and $d^4$ are confined between the flanges $d^5$ on the section M, and may be clamped to M by the screws $d^3$. The attaching-wing $d^6$ may be bent at an angle, as in Figs. 8 and 10, or be made straight, as in Fig. 9. The manner of attaching these wings to the jambs is illustrated in Fig. 1.

In Fig. 8 we have shown the bracket provided with a socket, $d'$, to receive the end of the bar, and a socket, $d^3$, to receive the neck of the ornamental knob. This is particularly applicable to large bars, and admits of placing the shank $e$ eccentrically.

The improvements in the master-balls F F, to which the free ends of the curtain are attached, is illustrated in Figs. 1, 4, 6, and 7, but best in Fig. 4. The lower part, $f$, of the ball is hemispherical, and this part is surmounted by a bail, $f'$, pierced with two holes, $i$ $i$, one for each side or strand of the doubled operating-cord B. The shank $g$ of the hook G screws centrally into the hemisphere $f$ and bail $f'$. In Fig. 4 this shank $g$ is shown provided with a disk or flange, $g'$, which enters a corresponding recess, $j$, in the bottom of the master-ball, as shown, and takes under a pin, $g^2$, which plays loosely in a hole extending from the recess $j$ up to one of the holes $i$ through which the cord passes. The cord B being passed through the holes $i$ $i$ the master-ball is attached to one side of the cord by screwing hook G into the ball until the flange $g'$ forces the pin $g^2$ firmly against the cord, thus confining the latter fast in the hole $i$ in the ball. The same object may be attained, as seen in Fig. 6, by placing the holes $i$ $i$ one above the other and clamping the cord to the ball where it passes through the lower hole by screwing the shank $g$ directly against it. In this case the flange $g'$ is omitted.

In Fig. 7 the holes $i$ $i$ are arranged side by side, as in Fig. 4, but so as to bring one of them directly over the end of the shank $g$. The dismemberment of the cord by the rotation of the screw is prevented by inserting a loose pin, $g^3$, between shank $g$ and the cord, to serve as a washer. With this construction, also, the flange $g'$ is unnecessary.

By either of these constructions the object we seek is attained—namely, the ability to shift the master-ball along the doubled cord, and clamp it to one side of the same, when changing the length of the bar, without dismounting the bar and the cord. To effect this, it is necessary to provide some means whereby the cord may be attached to and detached from the ball from outside of the bar. In our invention we do this through the medium of the hook G, which projects through the slot in the bar and outside far enough to be conveniently manipulated. The lower flange, $g^4$, on the stem $g$ is employed to prevent the hook G from being drawn up into the bar through the slot.

H in Fig. 4 represents a spring-clamp, which grips the curtain, and has a bail, $h$, whereby it is suspended from hook G. This clamp we do not claim.

Figs. 1 and 5 illustrate our improvement in the curtain-supporting devices not used as master-balls. This supporting device or carriage comprises two rollers, R R, each similar in shape to a hemisphere flattened at the pole, and both mounted on a spindle, $r^2$. Around this spindle and between the rollers the shank of hook G is looped, and then extended upward through a bail, $r$, attached to the ends of said spindle, as represented. The bail $r$, together with the hook-shank, which passes through it, separates and guides the two sides of the operating-cord.

The supporting-socket for the curtain-bar illustrated in Figs. 2 and 3 is formed of two parts, as shown in Fig. 2. The lower part remains attached to the jamb, while the upper part is removed to mount or dismount the bar. The division between the two parts is preferably made obliquely at an angle of about forty-five degrees, in order that the socket may be set close to the top arch or beam without interfering with the mounting of the bar. The projecting cylindrical portion of the socket is provided with an inturned flange, $s$, which takes over the projecting flange $l$ on the said cap $d'$ of the bar, as represented in Fig. 3, and this retains the bar in position.

Figs. 1 and 5 show hooks or eyelets P, attached to the front and under side of the curtain-bar, for the purpose of suspending therefrom a lambrequin or other supplemental or ornamental drapery. These eyelets are preferably fastened to the re-enforce rings $a'$.

The ends of the bar-sections telescoping with each other may be lined with soft fibrous material for the purpose of preventing the scratching of the polished surfaces in the act of changing the length of the bar, and to obtain a tight fit at the lapping ends of the sections.

Having thus described our invention, we claim—

1. As a support for a curtain-bar, a bracket having a socket, $d'$, formed on it to receive the end of the bar, and a socket, $d^3$, formed on its opposite side or face to receive the end ornament, W, substantially as set forth.

2. The combination, with a curtain-bar, of sockets to support or confine the ends of said bar, each socket being divided diametrically into two parts, and provided with a flange which retains endwise the end cap of the bar, substantially as set forth.

3. The combination, to form a three-part extensible bracket for a curtain-bar, of the intermediate section, M, provided with set-screws $d^3$ and lateral flanges $d^5$, the slotted section or part $d^2$, provided with the wing $d^6$, and the slotted section or part $d^4$, constructed to receive the end of the curtain-bar, all constructed to fit together and operated substantially as set forth.

4. The combination, with the cylindrical hollow bar, provided with a longitudinal narrow slot in its under side, and mechanism within said bar for operating a curtain lengthwise along the same, of a master-ball arranged within said bar and provided with an aperture for the passage of an operating-cord through said ball, and a screw-threaded curtain-supporting hook, G, constructed and operating to clamp the cord to the ball from outside the bar, said hook extending outside of the bar, and its shank provided with a disk, $g^4$, which is exterior to the bar and wider than the slot in the latter, substantially as and for the purposes set forth.

5. The combination, with a hollow slotted curtain-bar provided with internal mechanism for moving the curtain lengthwise along the bar, of the master-balls F F, provided with apertures *i* for the operating-cord B to pass through, a screw-hole at right angles to and between said cord-apertures, and a smooth hole opening into one of said cord-apertures to receive a pin, $g^2$, the said pin $g^2$, and the curtain-supporting hook G, provided with a screw-threaded shank, on which is a flange, $g'$, all constructed and arranged to operate substantially as set forth.

6. The combination, with a tubular slotted curtain-bar provided with internal mechanism for operating a curtain lengthwise along the same, of a master-ball provided with two cord-apertures for the passage of the two sides of the operating-cord, and a curtain-supporting hook, the shank of which hook screws into such ball, and by its entry into the ball causes the cord in one of said cord-apertures to be clamped to the ball, substantially as set forth.

7. The combination, with the tubular slotted curtain-bar, of the rings $a'$, made separate from and affixed to the bar at intervals, and the hooks P, affixed to said rings, substantially as set forth.

8. A curtain-bar provided with means, substantially as described, for moving a curtain endwise along the same, and with hooks or eyelets P, attached to its under and front side for the support of a supplemental lambrequin or other ornamental drapery, substantially as set forth.

9. The combination, with a curtain-bar, of curtain-supporting hooks and rollers arranged to travel along such bar, each set being formed of two rollers, R R, their spindle $r^2$, the bail *r*, and the hook G, with its shank looped around the spindle and piercing at its upper end the bail *r*, which bail is looped around the ends of the spindle $r^2$, the whole operating substantially as set forth.

10. The combination, with a curtain-bar provided with end caps having each an angular aperture therein, as set forth, of the cord-guiding sheaves, their frames provided with squares on their shanks to fit said apertures on the caps, and screw-threads to receive the nuts $e'$, and the said nuts $e'$, all arranged substantially as set forth.

In witness whereof we have hereunto set our hands in the presence of two subscribing witnesses.

LOUIS PAGE.
LOUIS WEBER.

Witnesses:
HENRY FR. KOCH,
ROBERT CREUZBAUR.